(12) United States Patent
Wimbock

(10) Patent No.: US 9,930,069 B2
(45) Date of Patent: Mar. 27, 2018

(54) OPERATION OF A SECURITY ELEMENT WITH THE SET OF OPERATING PARAMETERS MATCHED TO THE SELECTED USE PROFILE

(71) Applicant: GIESECKE & DEVRIENT GMBH, Munich (DE)

(72) Inventor: Ulrich Wimbock, Tutzing (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 21 days.

(21) Appl. No.: 14/899,256

(22) PCT Filed: Jun. 11, 2014

(86) PCT No.: PCT/EP2014/001589
§ 371 (c)(1),
(2) Date: Dec. 17, 2015

(87) PCT Pub. No.: WO2014/202192
PCT Pub. Date: Dec. 24, 2014

(65) Prior Publication Data
US 2016/0134661 A1    May 12, 2016

(30) Foreign Application Priority Data
Jun. 18, 2013   (DE) .................. 10 2013 010 261

(51) Int. Cl.
*H04L 29/06*    (2006.01)
*H04W 4/02*     (2018.01)
(Continued)

(52) U.S. Cl.
CPC .......... *H04L 63/20* (2013.01); *H04L 63/0853* (2013.01); *H04L 67/306* (2013.01);
(Continued)

(58) Field of Classification Search
CPC ... H04L 63/20; H04L 63/0853; H04L 67/306; H04W 4/028; H04W 8/183; H04W 12/06
See application file for complete search history.

(56) References Cited

U.S. PATENT DOCUMENTS

| 6,690,930 B1 * | 2/2004 | Dupre | ................. H04L 63/0853 455/411 |
| 7,512,107 B2 * | 3/2009 | Kang | ...................... G04R 20/14 370/328 |

(Continued)

FOREIGN PATENT DOCUMENTS

| DE | 102010019885 A1 | 11/2010 |
| DE | 102012003710 A1 | 8/2013 |
| EP | 2323311 A1 | 5/2011 |

OTHER PUBLICATIONS

International Search Report for corresponding International PCT Application No. PCT/EP2014/001589, dated Aug. 12, 2014.

*Primary Examiner* — Catherine B Thiaw
(74) *Attorney, Agent, or Firm* — Workman Nydegger

(57) ABSTRACT

A method for operating a security element which is part of a mobile end device, and a security element, have functionality depending on a set of operating parameters that is deposited on the security element. The method comprises the following steps: operating the security element with the set of operating parameters that is deposited on the security element; collecting data about the use of the security element and/or of the mobile end device; selecting a use profile on the basis of the collected data, with the use profile being assigned a set of operating parameters that is matched thereto; and operating the security element with the set of operating parameters that is matched to the selected use profile.

10 Claims, 2 Drawing Sheets

(51) Int. Cl.
*H04W 12/06* (2009.01)
*H04L 29/08* (2006.01)
*H04W 8/18* (2009.01)

(52) U.S. Cl.
CPC ........... *H04W 4/028* (2013.01); *H04W 8/183* (2013.01); *H04W 12/06* (2013.01)

(56) References Cited

U.S. PATENT DOCUMENTS

| | | | |
|---|---|---|---|
| 8,768,314 B2* | 7/2014 | Chien | G06F 21/6254 380/274 |
| 2004/0042604 A1* | 3/2004 | Hiltunen | H04W 8/205 379/211.05 |
| 2004/0204092 A1 | 10/2004 | Sato | |
| 2005/0101323 A1* | 5/2005 | De Beer | H04M 15/00 455/435.2 |
| 2007/0015538 A1* | 1/2007 | Wang | G06F 9/4448 455/558 |
| 2010/0293543 A1 | 11/2010 | Erhart et al. | |
| 2010/0325269 A1 | 12/2010 | Kim et al. | |
| 2011/0294472 A1* | 12/2011 | Bramwell | H04W 8/04 455/413 |
| 2012/0036282 A1* | 2/2012 | Chen | H04L 63/0428 710/9 |
| 2012/0084438 A1* | 4/2012 | Raleigh | H04L 41/046 709/224 |
| 2012/0102304 A1 | 4/2012 | Brave | |
| 2012/0178422 A1* | 7/2012 | Gayosso Sanchez | H04W 8/183 455/411 |
| 2013/0143560 A1* | 6/2013 | Nenner | H04W 8/183 455/435.1 |
| 2015/0119017 A1* | 4/2015 | Wu | H04L 63/20 455/419 |
| 2015/0200934 A1* | 7/2015 | Naguib | G06F 21/57 713/2 |

* cited by examiner

//, ///
OPERATION OF A SECURITY ELEMENT WITH THE SET OF OPERATING PARAMETERS MATCHED TO THE SELECTED USE PROFILE

FIELD OF THE INVENTION

This invention concerns a method for operating a security element, as well as such a security element. In particular, the invention concerns a method for managing settings of operating parameters of a security element, as well as such a security element.

BACKGROUND OF THE INVENTION

Security elements ("secure elements") are employed in many areas, for example as subscriber identification modules in the form of SIM cards for proving an access authorization to a mobile radio network or in the form of chip cards for carrying out electronic cash transactions. Their employment frequently involves interaction with a reader or end device intended for the particular application, for example a mobile telephone or a payment terminal. Except in the case of very simple applications, the security element is as a rule required to have a processor on which at least one application for executing the application runs. Many security elements are equipped in this connection with an operating system besides an application, with the program code of the application as well as the program code representing the operating system being stored in a non-volatile memory of the security element and being executed by its processor during operation.

It is not unusual that when a batch of security elements is being manufactured their area of employment in the field is as a rule not exactly known. Hence it can happen that the settings of operating parameters of a security element as performed by the manufacturer or issuer are not optimal for its actual employment, since the manufacturer or issuer must as a rule make a compromise insofar as the operating parameters must be chosen so as to allow an operation of the security element in substantially all potentially possible areas of employment.

For example, with a batch of security elements configured as subscriber identification modules in the form of SIM cards, it can happen that some of this batch of subscriber identification modules are employed in end devices having a substantially fixed location, such as vending machines, set-top boxes, sensor apparatuses or smart-meter apparatuses, in which the subscriber identification module is activated as a rule only briefly, i.e. logs into a mobile radio network only briefly in order to transmit a status report to a background system connected to the mobile radio network. Another part of said batch of subscriber identification modules, however, could be employed in end devices that frequently change their location and require in practice an uninterrupted access to a mobile radio network.

Against this background, the present invention is based on the object of providing an improved method for operating a security element, as well as an accordingly configured security element, which can at least partly remedy the hereinabove described disadvantages.

SUMMARY OF THE INVENTION

The hereinabove object is achieved according to the present invention by the respective subject matter of the independent claims. Advantageous embodiments of the invention are defined in the dependent claims.

The invention is based on the fundamental idea of configuring the security element such that during employment in the field the security element collects data or information about the actual use of the security element and/or of the end device, e.g. about the frequency at which certain functions of the security element are called up. Using said information collected by the security element, one or more operating parameters of the security element are adapted, through the selection of an appropriate use profile, such that the security element is optimally set for the actual use of the end device.

On the basis of the hereinabove described fundamental idea there is provided, according to a first aspect of the invention, a method for operating a security element which is part of a mobile end device, with the functionality of the security element depending on a set of operating parameters that is deposited on the security element. Such method comprises the following steps: operating the security element with the set of operating parameters that is deposited on the security element; collecting data about the use of the security element and/or of the end device; selecting a use profile on the basis of the collected data, with the use profile being assigned a set of operating parameters that is matched thereto; and operating the security element with the set of operating parameters that is matched to the selected use profile.

The term "operating parameters" is understood here to refer to parameters that influence the operation of the security element, i.e. influence how functions or services of the security element that are dependent on said operating parameters are executed by the security element. A set of operating parameters is understood according to the invention to also refer to a single operating parameter.

Preferably, the step of collecting data about the use of the security element and/or of the mobile end device is carried out by means of an application on the security element.

According to preferred embodiments of the invention, the step of selecting a use profile is effected through the security element.

According to alternative preferred embodiments, the step of selecting a use profile is effected through a server entity which is in communication with the security element and which has access to a database having a multiplicity of use profiles.

In this preferred embodiment, the security element is preferably a subscriber identification module which is configured for authenticating a subscriber toward a mobile radio network and communicating with the server entity via the mobile radio network.

According to a first preferred example, the method according to the first aspect of the invention can be used for adapting an operating parameter of the security element, said parameter determining the size as of which access counters deposited in a volatile memory of the security element and respectively stating the number of accesses to a respective memory page of the non-volatile memory of the security element are stored in the non-volatile memory of the security element.

According to a second preferred example, the method according to the second aspect of the invention can be used for adapting an operating parameter of the security element, said parameter determining the length of the time window within which the security element can log into the mobile radio network.

Preferably, the steps of the method according to the first aspect of the invention can be carried out several times in succession in order to iteratively determine optimal operating parameters and/or to be able to take account of changes of the use of the security element and/or of the mobile end device.

According to a second aspect of the invention, there is provided a security element which is part of a mobile end device. The functionality of the security element depends on a set of operating parameters that is deposited on the security element, and the security element is configured for being operated according to a method according to the first aspect of the invention.

A security element is for example a data carrier configured in hardware. The security element is for example arranged as a firmly integrated part in an end device, whereby it either cannot be removed in this form from the end device, for example as a subscriber identification module, M2M module, coprocessor, Trusted Base, Trusted Platform Module.

Alternatively, the security element is connected to the mobile end device as a removable module, for example as a chip card, in particular as a subscriber identification module, smart card, mass memory card, USB token, MultiMediaCard, secure MicroSD card, mobile radio network token, e.g. a UMTS Internet stick, and/or as an electronic identity document, for example as an electronic identity card or passport, with a person's machine-readable identification data deposited in a memory area.

According to a further alternative, the security element can be configured as a combination of hardware and software components in a trustworthy part of an operating system of the end device, which combination is also known to the skilled person as a secure runtime environment ("Trusted Execution Environment"; TEE). The subscriber identity module can then be configured for example within such a secure runtime environment in the form of programs running therein, so-called trustlets.

The security element is in principle a computer with reduced overall size and a reduced range of resources, which has a processor and at least one interface for communication with an external device. It frequently possesses no, or only a rudimentary, user data output of its own. The security element has in particular a data memory for depositing data, information, files and/or applications with appurtenant variables, whereby areas of the data memory can be volatile or non-volatile. The non-volatile data memory can be in particular permanent, such as a read-only memory, or ROM for short, or semi-permanent, such as an electrically erasable programmable read-only memory, or EEPROM for short, flash memory, ferroelectric random access memory, or FRAM or FeRAM memory for short, or magnetoresistive random access memory, or MRAM memory for short.

As the skilled person will recognize, the hereinabove described preferred embodiments can be implemented advantageously both within the scope of the first aspect of the invention, i.e. within the scope of the method for operating a security element, and within the scope of the second aspect of the invention, i.e. within the scope of the security element.

BRIEF DESCRIPTION OF THE DRAWINGS

Further features, advantages and objects of the invention will emerge from the following detailed description of several exemplary embodiments and alternative embodiments. Reference is made to the drawings, in which there are shown.

DETAILED DESCRIPTION OF VARIOUS EMBODIMENTS

Figure 1:
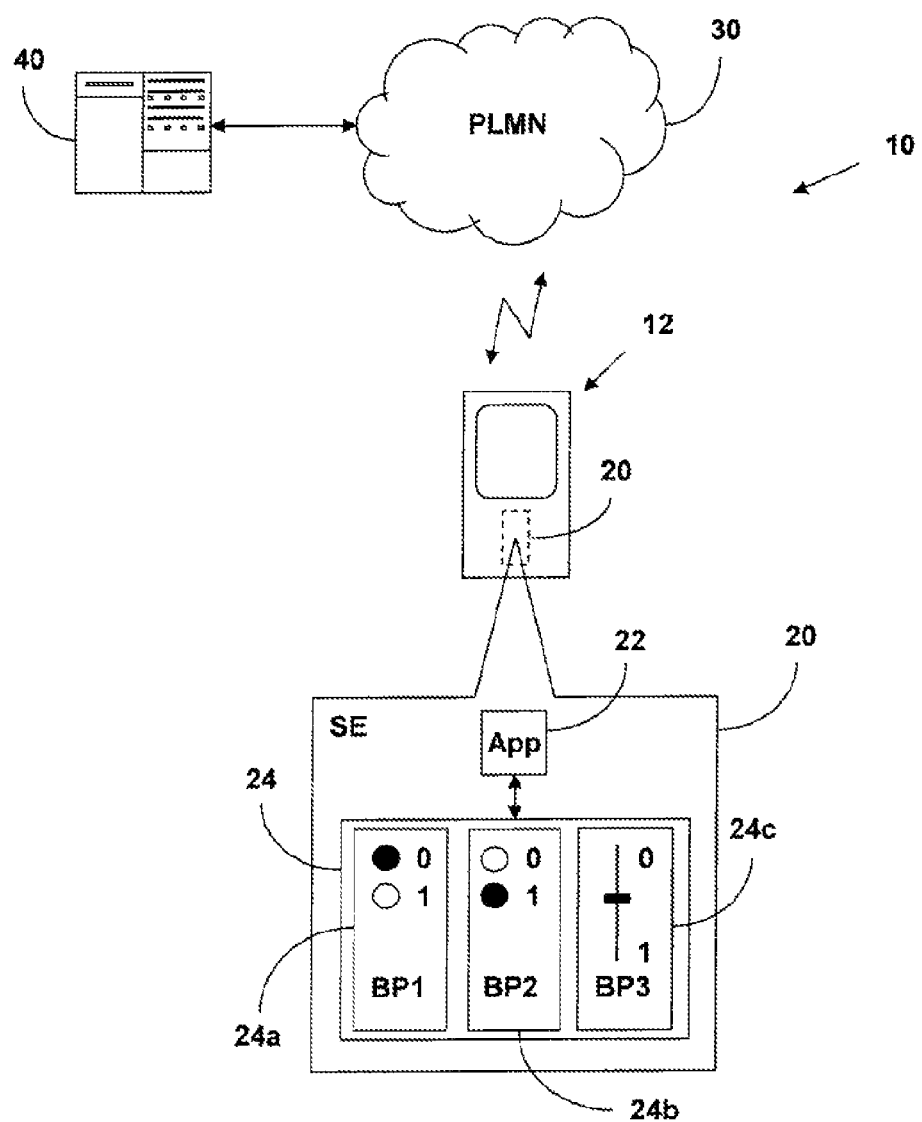
FIG. 1 a schematic representation of a communication system having a security element, which illustrates different aspects of the present invention, and FIG. 2 a schematic representation of a preferred sequence upon operation of the security element of FIG. 1.

FIG. 1 shows a schematic representation of the components of a communication system 10 as well as some the communication connections between said components, which illustrates different aspects of the present invention. Although reference will be made to a "mobile" end device in the following detailed description, the skilled person will recognize that the present invention can be implemented advantageously in connection with every kind of end device that is configured for communicating via a mobile or cellular communication network, i.e. also with end devices whose location practically does not change. In other words, the herein used attribute "mobile" relates to the ability of the end device to communicate via a mobile or cellular communication network, including IP-based mobile communication networks.

An exemplary mobile end device 12 is represented in FIG. 1, comprising a security element ("secure element") 20 for secure storing and processing of data that uniquely identify for example the mobile end device 12 and/or its user. As is indicated in FIG. 1, the mobile end device 12 is preferably a mobile telephone, a smartphone or a similar apparatus. The skilled person will recognize, however, that the mobile end device 12 according to the present invention can likewise be implemented in the form of other apparatuses, such as a tablet computer, a notebook, a TV system, a set-top box, a vending machine, an automobile, a surveillance camera, a sensor apparatus, and the like.

The communication system 10 represented in FIG. 1 further comprises a server entity 40 which is preferably part of a background system and is configured for interacting according to the invention with the mobile end device 12 and the security element 20. As is described hereinafter in more detail, the server entity 40 is preferably operated by the manufacturer or issuer of the mobile end device 12 and/or of the security element 20 or by a mobile network operator.

According to preferred embodiments of the invention, the security element 20 is configured as a subscriber identification module in the form of an eUICC or UICC with a SIM application running thereon, i.e. as a security element that is a fixed part of the mobile end device 12 and is used in a mobile radio network for unique and secure identification of the user and for supplying different functions and value-added services. Alternatively, the security element 20 can be configured as a subscriber identification module in the form of a SIM (Subscriber Identity Module), which is known to the skilled person as one of the currently most frequently used forms of security element. The skilled person will recognize, however, that other kinds of security elements in the form of subscriber identification modules, which are designated as USIM, R-UIM, ISIM and the like depending on the generation and type of underlying mobile communication system standard, are likewise comprised by the present invention.

According to further preferred embodiments of the invention, the security element 20 in the form of a subscriber identification module can be configured as a combination of hardware and software components in a trustworthy part of an operating system of the end device 12, which combination is also known to the skilled person as a secure runtime environment ("Trusted Execution Environment"; TEE). The security element 20 in the form of a subscriber identification module can then be configured for example within such a secure runtime environment of the end device 12 in the form of programs running therein, so-called trustlets.

Preferably, the mobile end device 12 is configured for communicating via the over-the-air interface with a mobile radio network (also designated as a "public land mobile network" [PLMN]) 30 which is operated by a mobile network operator (also designated as a "mobile network operator" [MNO]) preferably according to the GSM standard ("Global Standard For Mobile Communications"). Hereinafter some preferred embodiments of the invention will be described in connection with a mobile radio network 30 according to the GSM standards which are specified in a multiplicity of ETSI specifications. The skilled person will recognize, however, that the present invention can also be used advantageously in connection with other mobile radio systems. Such systems comprise third-generation mobile radio system (3GPP), such as UMTS (Universal Mobile Telecommunications System), mobile radio system of the next or fourth generation (4G), such as LTE (Long Term Evolution), as well as other mobile radio systems, such as CDMA, GPRS (General Packet Radio Service), and the like.

According to the invention, the security element 20 is configured for collecting data about its use and/or the use of the end device 12, i.e. collecting data about how the security element 20 and/or the mobile end device 12 are employed during operation. Preferably, this is effected through an application 22 implemented on the security element 20. For executing and storing said application 22 the security element 20 preferably has a processor and a memory. Besides such a processor and such a memory, the security element 20 preferably comprises an IO interface which is configured for enabling the communication between the security element 20 and the mobile end device 12, and which is for this purpose often configured as a contact area on one side of the security element 20. The memory can comprise a volatile memory portion (RAM) and a non-volatile memory portion. Preferably, the non-volatile memory portion is a flash memory (flash EEPROM). It may be for example a flash memory having a NAND architecture or a NOR architecture. Alternatively or additionally, the non-volatile memory portion may be a ROM. The application 22 can be implemented for example in the form of a Java applet. In this case, for supplying a runtime environment for the application 22 on the processor of the security element 20 there can be provided a corresponding operating system or a corresponding runtime environment, e.g. a Java Card™ Virtual Machine.

In the preferred embodiment represented in FIG. 1, operating parameters 24a-c are deposited in a preferably non-volatile memory area 24 of the security element 20. Said operating parameters 24a-c define parameters that influence the operation of the security element 20, i.e. how functions or services dependent on said operating parameters are executed by the security element 20. As is indicated in FIG. 1, an operating parameter may be a parameter that can assume a value from a discrete values range, as is the case with the operating parameters BP1 24a and BP2 24b with the exemplary values "0 and "1" as represented in FIG. 1, or a parameter that can assume a value from one or more continuous values ranges, as is the case with the operating parameter BP3 24c represented in FIG. 1, which can assume by way of example a value from the values range of 0 to 1.

Figure 2:
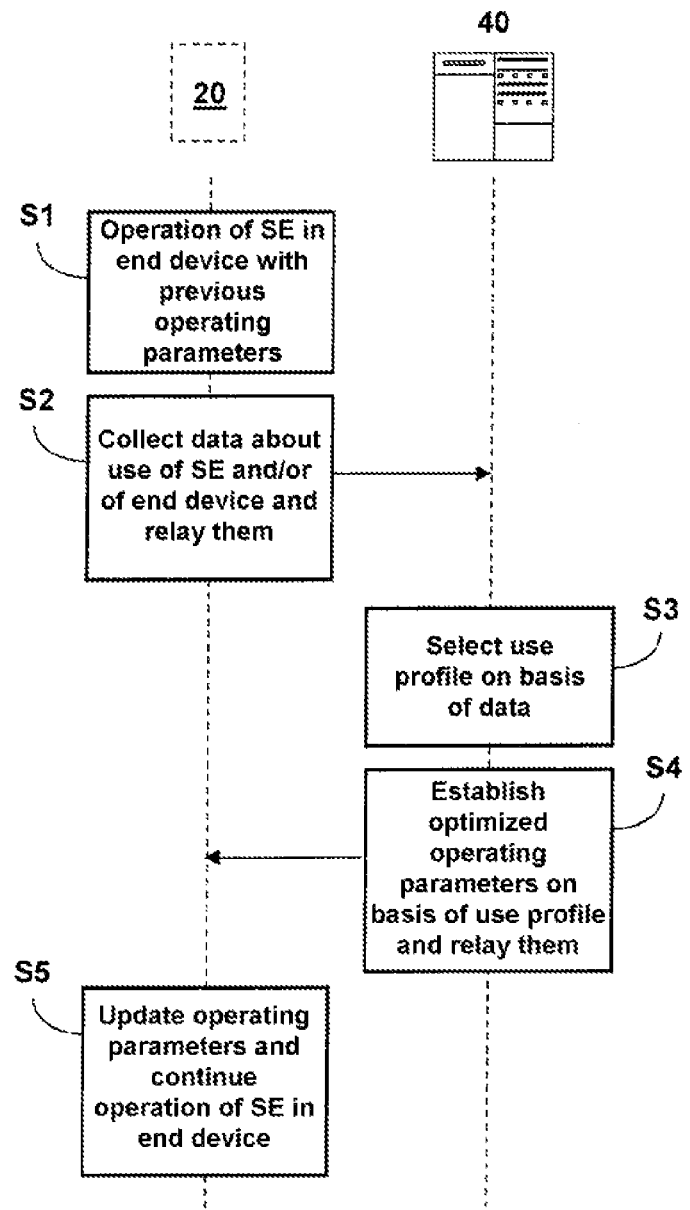

FIG. 2 shows the preferred sequence upon operation of the security element 20 according to the present invention. The starting point is the normal operation of the security element 20 in the mobile end device 12 with the operating parameters set or predefined for example by the manufacturer and/or the issuer of the security element 20, as is shown in step S1 of FIG. 2. As already described hereinabove, the security element 20 is set according to the invention for collecting data about its use and/or the use of the mobile end device 12 and relaying the collected data to the server entity 40 (step S2 of FIG. 2). Data about the use of the security element 20 and/or the use of the mobile end device 12 are understood according to the invention to be in particular those data that depend on the respective choice of the operating parameters of the security element 20, i.e. on which the respective choice of the operating parameters has an influence.

After the security element 20 has relayed the data collected in step S2 of FIG. 2 to the server entity 40, the server entity determines a use profile of the security element 20 on the basis of said data in step S3 of FIG. 2. If the data collected by the security element 20 in step S2 of FIG. 2 indicate for example that the mobile end device 12 in which the security element 20 is located changes position frequently, the security element 20 could be assigned a use profile "mobile end device" in step S3 of FIG. 2. If otherwise the data collected by the security element 20 in step S2 of FIG. 2 indicate that the mobile end device 12 in which the security element 20 is located is substantially stationary, the security element 20 could be assigned a use profile "stationary end device". A suitable datum for capturing the mobility of the end device 12 could be e.g. the frequency at which a file deposited on the security element 20 that states the position of the end device 12 or of the security element 20 contained therein (in the case of a security element 20 in the form of a SIM for example the file "EF_LOCI" deposited on the SIM and continually updated) changes over a predefined time period. The skilled person will recognize by the very simple example hereinabove that this exemplary assignment or classification of the data collected by the security element 20 about its use or the use of the end device 12 according to use profiles can be refined at will, and more than one datum can be taken into account upon determination of a use profile with optimized operating parameters.

In step S4 of FIG. 2 there is effected a determining or a selecting of optimized operating parameters on the basis of the use profile determined by the server entity 40 in step S3, as well as a relaying of said optimized operating parameters to the security element 20. Preferably, for selecting a suitable use profile the server entity 40 possesses a database or has access to a corresponding external database in which a set of optimized operating parameters is respectively deposited for a multiplicity of defined use profiles.

In step S5 of FIG. 2 the security element 20 adopts the operating parameters transmitted by the server entity 40 in step S4 of FIG. 2 and continues operation therewith. In this connection it may be necessary in practice to restart the security element 20, for example by means of a reset operation.

Since the area of employment or the use of a security element or of an end device can change in the course of time, it is imaginable according to the invention that after step S5 of FIG. 2 the method is continued with steps S1 and S2 of FIG. 2. This can likewise be advantageous according to the invention in case the supposedly optimized operating parameters turn out in actual operation to be still optimizable. In this case, it is conceivable according to the invention that optimal operating parameters are found iteratively by means of a plurality of runs through the preferred method represented in FIG. 2.

As is known to the skilled person, it can be advantageous to cryptographically secure the steps represented in FIG. 2 in which security-critical data are exchanged between the security element 20 and the server entity 40, for example by encrypting and decrypting data by means of suitable cryptographic key pairs and/or forming a checksum therefor.

The skilled person will recognize that the present invention is not restricted to the preferred sequence represented in FIG. 2 and the preferred details shown there. For example, step S3 of determining a use profile on the basis of the data collected by the security element 20 could also be carried out by the security element 20 itself instead of by the server entity 40.

Hereinafter will be described two examples of operating parameters that can be optimized by means of the present invention and therefore lead to a better matching of the security element to the actual area of employment of the security element or of the end device. The skilled person will recognize, however, that the examples hereinafter are non-exhaustive and that there are a multiplicity of further operating parameters that are suitable for being matched to the actual area of employment of the security element 20 by means of the present invention.

As already described hereinabove, the security element 20 is preferably configured as a subscriber identification module, for example in the form an eUICC or a SIM, for identifying a subscriber toward a mobile radio network, for example the PLMN 30 represented in FIG. 1. Such subscriber identification modules have as a rule a non-volatile memory in the form of a flash memory in which only a limited number of accesses is ensured by the memory manufacturer.

From DE102012003710 is known a method for using respective access counters to track how often the respective memory pages of the flash memory of the subscriber identification module are accessed. So as not to thereby tax the flash memory further, the values of said access counters are stored and updated on the volatile memory, as a rule a RAM, of the subscriber identification module. Only in case the value of an access counter exceeds a predefined threshold value, the values of the access counters are written to the flash memory, in order to also be available after a reset operation of the subscriber identification module. When such a method is implemented in a subscriber identification module that is part of a mobile end device that logs into a mobile radio network only over a short time period as a rule, it can happen that a predefined threshold value that is chosen too high is never reached. If, in contrast, the predefined threshold value is chosen too low, the number of accesses to the flash memory increases unnecessarily, which leads to greater wear of the flash memory.

Said threshold value is a preferred example of an operating parameter that can be adapted according to the present invention. For adapting said operating parameter to the actual use of the security element 20 or of the end device 12, the application 22 of the security element 20 preferably collects data (according to step S2 in FIG. 2) about how long on average the security element 20 is logged into the PLMN 30. For this purpose the application 22 could establish as data according to step S2 of FIG. 2 for example the number of status commands that are sent by the security element 20 from logging into the PLMN 30 until logging out therefrom (usually through a reset operation), since status commands are sent at regular intervals by a security element in the form of a subscriber identification module and therefore define a kind of time unit.

Should said data indicate that the security element 20 is logged into the PLMN 30 only over short time periods on average, the server entity 40 (or alternatively the security element 20 itself) can select a use profile with a lower threshold value, in order that the method described in DE102012003710 can be used properly. If, on the other hand, said data indicate that the security element 20 is logged into the PLMN 30 over long time periods on average, the server entity 40 (or alternatively the security element 20 itself) can select a use profile with a higher threshold value in order not to needlessly tax the flash memory of the security element 20.

When a mobile end device with a security element in the form of a subscriber identification module is located in the border region between two or more mobile radio networks, there may be frequent changes between said mobile radio networks when auto-roaming is activated, which could impair the operation of the mobile end device. As is known to the skilled person, the security element in the form of a subscriber identification module has as a rule a separate subscription with a separate IMSI for each mobile radio network, whereby only one subscription can ever be active. To enable the mobile end device to have a network access as nearly seamless as possible, there is usually defined on the security element the length of a time window within which the security element must successfully log into another mobile radio network. If there is no logging into another mobile radio network within said time window of predefined length, the hitherto used mobile radio network is used, i.e. the hitherto used subscription is reactivated.

The length of said time window for logging in is a further preferred example of an operating parameter that can be adapted according to the present invention. For adapting said operating parameter to the actual use of the security element 20 or of the end device 12, the application 22 of the security element 20 preferably collects data (according to step S2 in FIG. 2) about how long on average one subscription of the plurality of subscriptions of the security element 20 is active. For this purpose the application 22 could establish as data according to step S2 of FIG. 2 for example the number of status commands that are sent by the security element 20 from activating until deactivating of a respective subscription.

If said data show that the subscriptions of the security element 20 are active on average only briefly (e.g. less than ten status commands per subscription), this indicates that there is a frequent change between the subscriptions, which, as mentioned hereinabove, can lead to an impairment of the functionality of the mobile end device 12. To counteract this, the server entity 40 (or alternatively the security element 20 itself) can select a use profile with a longer time window for logging into a mobile radio network on the basis of said data according to step S3 of FIG. 2.

The invention claimed is:
1. A method for operating a security element implemented in hardware, the security element being part of a mobile end device, with the functionality of the security element depending on a set of operating parameters that is deposited on the security element, wherein the method comprises the following steps:
 operating the security element with the set of operating parameters that is deposited on the security element, the security element including an embedded micropro- cessor and a data memory, the embedded microprocessor including a secure area that hosts a trusted execution environment;

collecting data about the use of the security element and/or of the mobile end device;

the trusted execution environment hosted in the security element selecting a use profile on the basis of the collected data, with the use profile being assigned a set of optimized operating parameters that is matched thereto based on the collected data; and operating the security element with the set of optimized operating parameters that is matched to the selected use profile, wherein at least one of the optimized security element operating parameters is different from the deposited set of operating parameters.

2. The method according to claim 1, wherein the step of collecting data about the use of the security element and/or of the mobile end device is carried out by means of an application on the security element.

3. The method according to claim 1, wherein the step of selecting a use profile is effected through the security element.

4. The method according to claim 1, wherein the step of selecting a use profile is effected through a server entity which is in communication with the security element and which has access to a database having a multiplicity of use profiles.

5. The method according to claim 4, wherein the security element is a subscriber identification module which is configured for authenticating a subscriber toward a mobile radio network and communicating with the server entity via the mobile radio network.

6. The method according to claim 5, wherein the method is used for adapting an operating parameter of the security element, said parameter determining the size as of which access counters deposited in a volatile memory of the security element and respectively stating the number of accesses to a respective memory page of the non-volatile memory of the security element are stored in the non-volatile memory of the security element.

7. The method according to claim 5, wherein the method is used for adapting an operating parameter of the security element, said parameter determining the length of the time window within which the security element can log into the mobile radio network.

8. The method according to claim 1, wherein the steps of the method are carried out several times in succession in order to iteratively determine optimal operating parameters and/or to be able to take account of changes of the use of the security element and/or of the mobile end device.

9. A security element implemented in hardware which is part of a mobile end device, with the functionality of the security element depending on a set of operating parameters that is deposited on the security element, wherein the security element is configured to perform the following:

operate the security element with the set of operating parameters that is deposited on the security element, the security element including an embedded microprocessor and a data memory, the embedded microprocessor including a secure area that hosts a trusted execution environment;

collect data about the use of the security element and/or of the mobile end device;

select, using the trusted execution environment hosted in the security element, a use profile on the basis of the collected data, with the use profile being assigned a set of optimized operating parameters that is matched thereto based on the collected data; and operate the security element with the set of optimized operating parameters that is matched to the selected use profile, wherein at least one of the optimized security element operating parameters is different from the deposited set of operating parameters.

10. The security element of claim 9, wherein the security element is implemented in a mobile end device.

\* \* \* \* \*